US012634908B2

(12) United States Patent (10) Patent No.: US 12,634,908 B2
Wu et al. (45) Date of Patent: May 19, 2026

(54) TRANSMISSION RESOURCE DETERMINING METHOD AND DEVICE

(71) Applicant: VIVO MOBILE COMMUNICATION CO., LTD., Dongguan (CN)

(72) Inventors: Kai Wu, Dongguan (CN); Lihui Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 291 days.

(21) Appl. No.: 18/377,763

(22) Filed: Oct. 6, 2023

(65) Prior Publication Data

US 2024/0049202 A1 Feb. 8, 2024

Related U.S. Application Data

(63) Continuation of application No. PCT/CN2022/085735, filed on Apr. 8, 2022.

(30) Foreign Application Priority Data

Apr. 8, 2021 (CN) ........................ 202110379767.X

(51) Int. Cl.
*H04W 72/0453* (2023.01)
*H04W 72/21* (2023.01)

(52) U.S. Cl.
CPC ....... *H04W 72/0453* (2013.01); *H04W 72/21* (2023.01)

(58) Field of Classification Search
CPC ............. H04W 72/0453; H04W 72/21; H04W 72/1221; H04W 72/1268; H04W 72/1263; H04L 5/14; H04L 5/00; H04L 1/08; H04L 5/0094; H04L 5/143; H04L 5/0053
See application file for complete search history.

(56) References Cited

U.S. PATENT DOCUMENTS

| | | | | |
|---|---|---|---|---|
| 12,231,939 | B2* | 2/2025 | Jeon ........................ | G01S 13/26 |
| 12,238,770 | B2* | 2/2025 | Bae ........................ | H04L 1/1864 |
| 2021/0176028 | A1* | 6/2021 | Zhou ...................... | H04W 72/23 |
| 2022/0150928 | A1* | 5/2022 | Choi ...................... | H04L 5/0078 |
| 2022/0312483 | A1* | 9/2022 | Bae .......................... | H04L 1/08 |

(Continued)

FOREIGN PATENT DOCUMENTS

| | | |
|---|---|---|
| CN | 110830194 A | 2/2020 |
| CN | 113056003 A | 6/2021 |
| WO | 2020029698 A1 | 2/2020 |

(Continued)

OTHER PUBLICATIONS

Extended European Search Report issued in related European Application No. 22784126.9, mailed Oct. 21, 2024, 8 pages.

(Continued)

*Primary Examiner* — Brian T O Connor
(74) *Attorney, Agent, or Firm* — IPX PLLC

(57) ABSTRACT

A transmission resource determining method and device are provided. The transmission resource determining method includes: according to frequency domain resource type information on a time unit of an uplink transmission, determining, by a terminal, at least one of the following: whether to transmit a first uplink channel; and a frequency domain resource for transmitting the first uplink channel.

17 Claims, 9 Drawing Sheets

(56) References Cited

U.S. PATENT DOCUMENTS

2023/0040978 A1\* 2/2023 Huang ................. H04L 5/0051

FOREIGN PATENT DOCUMENTS

| WO | 2020167650 A1 | 8/2020 |
| WO | 2021020955 A1 | 2/2021 |
| WO | 2021027936 A1 | 2/2021 |

OTHER PUBLICATIONS

First Office Action issued in related Chinese Application No. 202110379767.X, mailed Sep. 6, 2024, 10 pages.
Vivo, "Discussion on wideband operation in NR-U", Gpp tsg_ran\wg1_rl1,tsgr1_98b, R1-19102083, Oct. 2019, 6 pages.
International Search Report issued in corresponding International Application No. PCT/CN2022/085735, mailed Jun. 16, 2022, 4 pages.
Sharp, "Remaining issues on UL signals/channels for NR-U", 3GPP TSG RAN WG1 #100bis, R1-2002382, Apr. 2020, 14 pages.

\* cited by examiner

12

Network side
device

11

11

Terminal

Terminal

200

According to frequency domain resource type information on a time
unit of an uplink transmission, a terminal determines at least one of the
following: whether to transmit a first uplink channel; and a frequency
domain resource for transmitting the first uplink channel
⟍ S202

Figure 10:
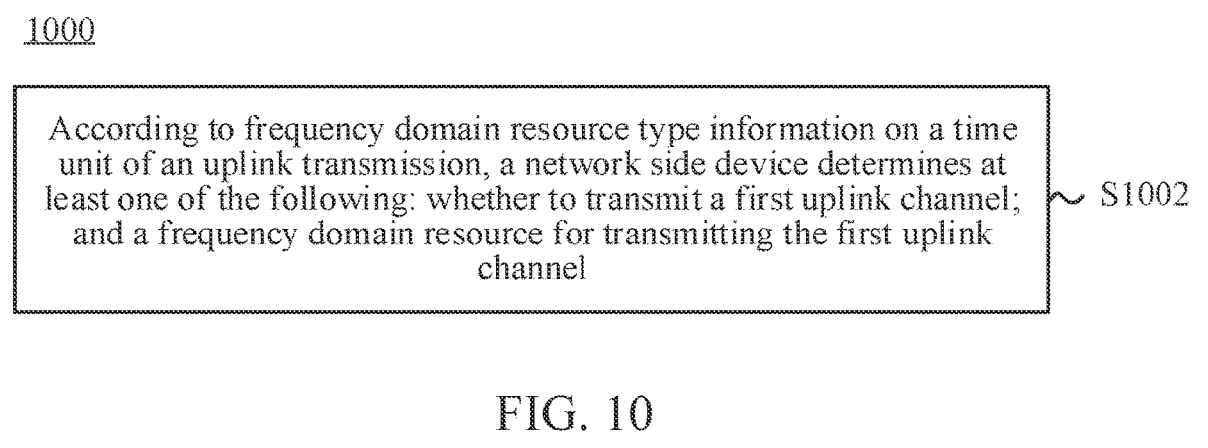

1000

According to frequency domain resource type information on a time
unit of an uplink transmission, a network side device determines at
least one of the following: whether to transmit a first uplink channel;
and a frequency domain resource for transmitting the first uplink
channel

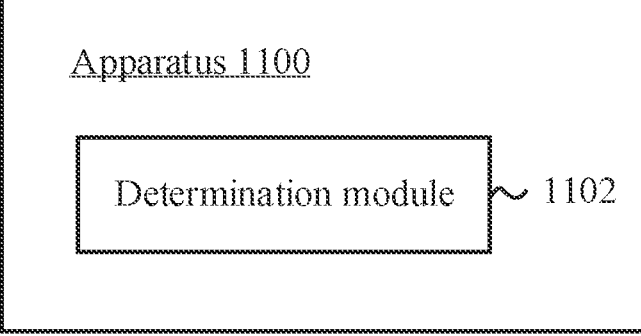
FIG. 11
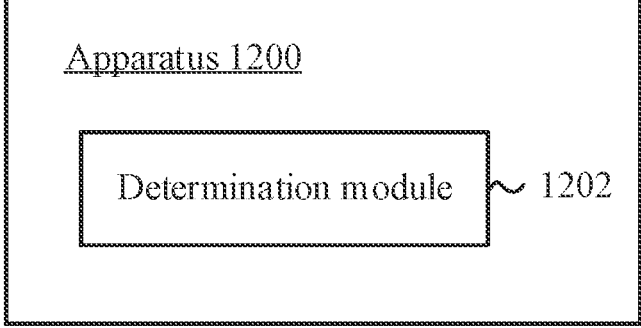
FIG. 12
FIG. 13

TRANSMISSION RESOURCE DETERMINING METHOD AND DEVICE

CROSS-REFERENCE TO RELATED APPLICATION

This application is a continuation of International Application No. PCT/CN2022/085735, filed on Apr. 8, 2022, which claims priority to Chinese Patent Application No. 202110379767.X, filed Apr. 8, 2021. The entire contents of each of the above-identified applications are expressly incorporated herein by reference.

TECHNICAL FIELD

This application is directed to the technical field of communications, and in particular, relates to a transmission resource determining method and device.

BACKGROUND

For full duplex or flexible duplex networks, uplink/downlink transmission directions on different frequency domain resources at the same time may be different. If transmission resources of uplink channels such as a Physical Uplink Control CHannel (PUCCH) and a Physical Uplink Shared CHannel (PUSCH) overlap with resources other than uplink, the uplink channel cannot be transmitted, thereby affecting the communication efficiency.

SUMMARY

Embodiments of this application provide a transmission resource determining method and device.

According to a first aspect, a transmission resource determining method is provided and includes: according to frequency domain resource type information on a time unit of an uplink transmission, determining, by a terminal, at least one of the following: whether to transmit a first uplink channel; and a frequency domain resource for transmitting the first uplink channel.

According to a second aspect, a transmission resource determining method is provided and includes: according to frequency domain resource type information on a time unit of an uplink transmission, determining, by a network side device, at least one of the following: whether to transmit a first uplink channel; and a frequency domain resource for transmitting the first uplink channel.

According to a third aspect, a transmission resource determining apparatus is provided and includes: a determination module, configured to: according to frequency domain resource type information on a time unit of an uplink transmission, determines at least one of the following: whether to transmit a first uplink channel; and a frequency domain resource for transmitting the first uplink channel.

According to a fourth aspect, a transmission resource determining apparatus is provided and includes: a determination module, configured to: according to frequency domain resource type information on a time unit of an uplink transmission, determines at least one of the following: whether to transmit a first uplink channel; and a frequency domain resource for transmitting the first uplink channel.

According to a fifth aspect, a terminal is provided. The terminal includes a processor, a memory, and a program or instruction stored in the memory and runnable on the processor. The program or instruction, when being executed by the processor, implements steps of the method according to the first aspect.

According to a sixth aspect, a terminal is provided. The terminal includes a processor and a communication interface, where the processor is configured to: according to frequency domain resource type information on a time unit of an uplink transmission, determine at least one of the following: whether to transmit a first uplink channel; and a frequency domain resource for transmitting the first uplink channel.

According to a seventh aspect, a network side device is provided. The network side device includes a processor, a memory, and a program or instruction stored in the memory and runnable on the processor. The program, when being executed by the processor, implements steps of the method according to the second aspect.

According to an eighth aspect, a network side device is provided. The terminal includes a processor and a communication interface, where the processor is configured to: according to frequency domain resource type information on a time unit of an uplink transmission, determine at least one of the following: whether to transmit a first uplink channel; and a frequency domain resource for transmitting the first uplink channel.

According to a ninth aspect, a readable storage medium is provided. The readable storage medium stores a program or instruction. The program or instruction, when being executed by a processor, implements steps of the method according to the first aspect or implements steps of the method according to the second aspect.

According to a tenth aspect, a chip is provided. The chip includes a processor and a communication interface, where the communication interface is coupled to the processor; and the processor is configured to run a program or instruction to implement the method according to the first aspect or implement the method according to the second aspect.

According to an eleventh aspect, a computer program/program product is provided. The computer program/program product is stored in a non-volatile storage medium and is executed by at least one processor to implement the method according to the first aspect or implement the method according to the second aspect.

In the embodiments of this application, the terminal may determine whether to transmit the first uplink channel and/or determine the frequency domain resource for transmitting the first uplink channel according to the frequency domain resource type information on the time unit of the uplink transmission.

BRIEF DESCRIPTION OF THE DRAWINGS

FIG. 10 is a flowchart of a transmission resource determining method according to an embodiment of this application;

FIG. 11 is a block diagram of a transmission resource determining apparatus according to an embodiment of this application;

FIG. 12 is a block diagram of a transmission resource determining apparatus according to an embodiment of this application:

FIG. 13 is a block diagram of a communication device according to an embodiment of this application:

DETAILED DESCRIPTION

The embodiments of this application are described below with reference to the accompanying drawings in the embodiments of this application. Apparently, the described embodiments are merely some rather than all of the embodiments of this application. All other embodiments obtained by those of ordinary skill in the art based on the embodiments of this application fall within the protection scope of this application.

Terms "first" and "second" in the description and the claims of this application are used to distinguish similar objects, but are not used to describe a specific sequence or order. It is to be understood that terms used in this way are exchangeable in a proper case, so that the embodiments of this application can be implemented in an order different from the order shown or described herein. Furthermore, the objects distinguished by "first" and "second" usually belong to one type, and the number of the objects is not limited. For example, the first object may be one or more. In addition, in the description and the claims, "and/or" represents at least one of the connected objects, and the character "/" generally indicates that the contextual objects have an "or" relationship.

The technologies described in the embodiments of this application are not limited to the Long Term Evolution (LTE)/LTE-Advanced (LTE-A) system, and may further be applied to other wireless communication systems such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA) and other systems. In the embodiments of this application, terms "system" and "network" are often exchangeable, and the technology described in this application can be applied to the systems and radio technologies mentioned above, or can be applied to other systems and radio technologies. a New Radio (NR) system is described in the following description for illustrative purposes, and the NR terminology is used in most of the following description. These technologies can also be applied to applications other than the NR system application, for example, a 6th Generation (6G) communication system.

Figures 1, 2:
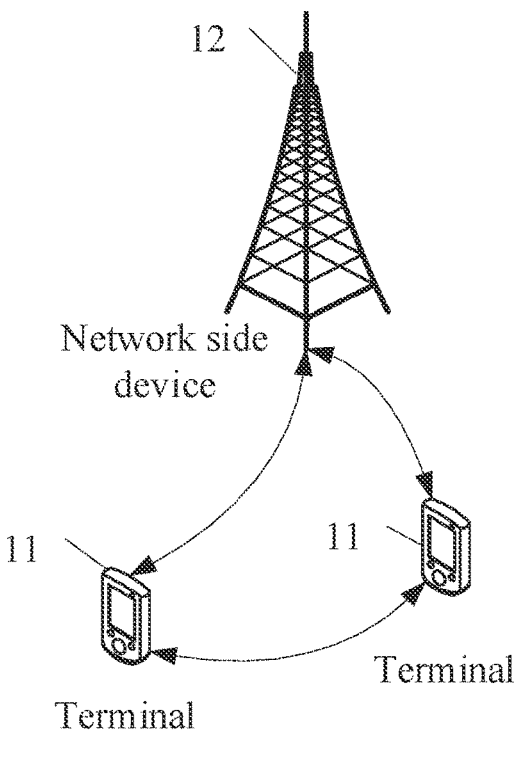
FIG. 1 is a schematic diagram of a wireless communication system according to an embodiment of this application.
FIG. 2 is a flowchart of a transmission resource determining method according to an embodiment of this application.

FIG. 1 is a schematic diagram of a wireless communication system according to an embodiment of this application. The wireless communication system includes a terminal 11 and a network side device 12. The terminal 11 may also be referred to as a terminal device or User Equipment (UE), and the terminal 11 may be a mobile phone, a tablet computer, a laptop computer or a notebook computer, a Personal Digital Assistant (PDA), a palm computer, a netbook, an Ultra-Mobile Personal Computer (UMPC), a Mobile Internet Device (MID), a wearable device or a Vehicle User Equipment (VUE), a Pedestrian User Equipment (PUE) and other terminal side devices. The wearable device includes: a smart watch, a bracelet, an earphone and glasses. The specific type of the terminal 11 is not limited in the embodiments of this application. The network side device 12 may be a base station or a core network. The base station may be referred to as a NodeB, an evolved NodeB, an access point, a Base Transceiver Station (BTS), a radio base station, a radio transceiver, a Basic Service Set (BSS), an Extended Service Set (ESS), a NodeB, an evolved NodeB (eNB), a next generation NodeB (gNB), a home NodeB, a home evolved NodeB, a WLAN access point, a WiFi node, a Transmitting Receiving Point (TRP) or another appropriate term in the art. Provided that the same technical effects are achieved, the base station is not limited to specific technical terms. In the embodiments of this application, the base station in the NR system is merely used as an example, but does not limit a specific type of the base station.

The transmission resource determining method and device provided by the embodiments of this application are described below in detail with reference to the accompanying drawings and through some embodiments and application scenarios thereof.

As shown in FIG. 2, the embodiments of this application provide a transmission resource determining method 200. The method may be performed by a terminal. In other words, the method may be performed by software or hardware installed at the terminal. The method includes the following steps:

S202: according to frequency domain resource type information on a time unit of an uplink transmission, determining, by a terminal, at least one of the following: whether to transmit a first uplink channel; and a frequency domain resource for transmitting the first uplink channel.

The uplink transmission mentioned in the step may be a transmission of one or more transmission occasions of the first uplink channel. The uplink channel may be a Physical Uplink Control CHannel (PUCCH) or a Physical Uplink Shared CHannel (PUSCH).

The time unit mentioned in the step includes at least one of the following: a symbol, a slot, a subslot and a subframe. For example, the time unit may be at least one symbol, at least one slot, at least one subslot or at least one subframe.

The frequency domain resource type information may include direction information of frequency domain resource transmission, and the direction information of frequency domain resource transmission may include at least one of the following: downlink (D), uplink (U), flexible (F) and a guardband.

Before S202, the terminal may receive indication information. The indication information is used to indicate the frequency domain resource type information, for example, indicate direction information of frequency domain resource transmission. The indication information may be a high-layer signaling, or a Media Access Control Control Element (MAC CE) signaling, or Downlink Control Information (DCI).

The granularity determined by the frequency domain resource type information may be a subband. One subband may include one or more Resource Block (RB). The one or more resource blocks may also be referred to as a Resource Block set (RB set).

The subband mentioned in each embodiment of this application may represent a plurality of consecutive RB; therefore, the subband may be described by the RB set.

The guardband mentioned in each embodiment of this application represents the frequency domain resource on which the terminal does not send or receive a signal/channel. The frequency domain resource may be described through the number of RB/Resource Element (RE) and the RB/RE position, or may be a frequency range.

For different time units (such as slot/symbol/subframe), the direction configurations of the subbands may be different, and the sizes of the subbands may also be different.

To describe the subband, the time unit and the direction information of frequency domain resource transmission in detail, description is performed below in combination with the two specific examples of FIG. 3 and FIG. 4.

Figure 3:
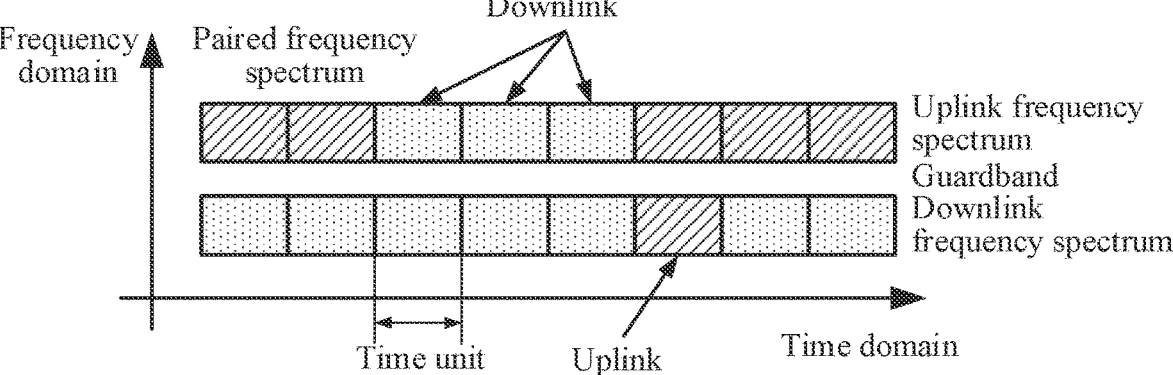
FIG. 3 is a schematic diagram of frequency domain resource type information on a time unit according to an embodiment of this application.

As shown in FIG. 3, FIG. 3 schematically shows a frequency spectrum schematic diagram in a case that a network side device is flexible/full duplex. FIG. 3 is a paired frequency spectrum of Frequency Division Duplexing (FDD). An uplink or downlink frequency spectrum of FDD may be semi-statically configured or dynamically indicated as a downlink or uplink transmission at a certain time unit (such as slot/symbol).

On the third time unit to the fifth time unit, the uplink frequency spectrum is configured as downlink; and on the sixth time unit, the downlink frequency spectrum is configured as uplink. FIG. 3 schematically shows two subbands, actually, the number of the subbands is not limited to this. In addition, in a frequency domain direction, a guardband is arranged between the subbands.

Figure 4:
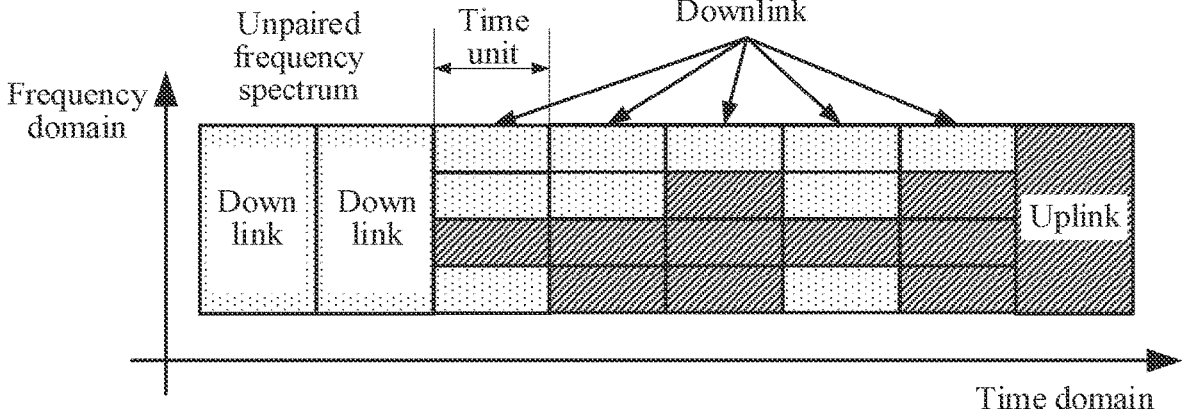
FIG. 4 is a schematic diagram of frequency domain resource type information on a time unit according to an embodiment of this application.

As shown in FIG. 4, FIG. 4 schematically shows a frequency spectrum schematic diagram in a case that a network side device is flexible/full duplex. FIG. 4 is an unpaired frequency spectrum of Time Division Duplexing (TDD). Different frequency domain resources on a certain time unit (such as slot/symbol) of TDD may be semi-statically configured or dynamically indicated as an uplink transmission and a downlink reception.

As shown in the third time unit to the seventh time unit in FIG. 4, there are uplink subbands and downlink subbands on the five time units. FIG. 4 schematically shows four subbands, actually, the number of the subbands is not limited to this. In addition, in a frequency domain direction, a guardband may be arranged between the subbands. FIG. 4 does not show the guardband.

For the paired frequency spectrum and the unpaired frequency spectrum, before S202, the terminal may receive indication information. The indication information is used to: inform a transmission/reception direction of the terminal on the time unit (that is, on which slot/symbol), and a transmission/reception direction of the terminal on the frequency (that is, on which subband, sub-carrier, and RB). Here, the transmission/reception directions may be uplink (U), downlink (D), or flexible (F).

In this embodiment, according to the frequency domain resource type information on the time unit of the uplink transmission, the terminal may determine at least one of the following: whether to transmit a first uplink channel; and a frequency domain resource for transmitting the first uplink channel. The terminal may be a half-duplex terminal.

For example, in a case of determining that a first transmission resource of the uplink transmission overlaps with an unavailable resource (such as a downlink subband, a flexible subband and a guardband), it is considered that the first transmission resource is an unavailable resource, and the first uplink channel is not transmitted on the first transmission resource.

For another example, in a case of determining that a first transmission resource of the uplink transmission is an available transmission resource, it is considered that the first transmission resource is the available transmission resource, and the first uplink channel is transmitted on the first transmission resource.

In some implementations, after S202, the method may further include the following steps: in a case of determining the frequency domain resource for transmitting the first uplink channel, the first uplink channel may be transmitted through the determined frequency domain resource; and/or in a case of determining that the first uplink channel is transmitted, the first uplink channel may be transmitted, for example, the first uplink channel is transmitted through the determined frequency domain resource.

In this embodiment, the terminal may determine the transmission resource of the first uplink channel according to uplink and downlink configuration information of the subband, so that when the frequency domain resource is not used for the uplink transmission, a transmission behavior of the terminal is determined, including: determining whether to transmit the first uplink channel, or determining a new transmission resource of the first uplink channel, so that scheduling at the network side device is more flexible, the transmission behavior of the terminal is clearer, and higher transmission performance can be achieved.

In the transmission resource determining method provided by the embodiments of this application, the terminal may determine whether to transmit the first uplink channel and/or determine the frequency domain resource for transmitting the first uplink channel according to the frequency domain resource type information on the time unit of the uplink transmission, thereby solving the problem that the communication efficiency is affected because the terminal cannot transmit the uplink channel, and improving the communication efficiency.

According to the frequency domain resource type information on the time unit of the uplink transmission, the terminal in the embodiment 200 may determine at least one of the following: whether to transmit a first uplink channel; and a frequency domain resource for transmitting the first uplink channel. Detail will be described below with reference to several specific examples.

Example 1

As mentioned in the embodiment 200, according to the frequency domain resource type information on the time unit of the uplink transmission, the terminal determines whether to transmit the first uplink channel, which includes: according to the frequency domain resource type information on the time unit of the uplink transmission, the terminal does not transmit the first uplink channel on the first transmission resource in a case of determining that a first transmission resource of the uplink transmission overlaps with an unavailable resource.

The unavailable resource may include at least one of the following: a resource in a downlink subband, a resource in a flexible subband, and a resource in a guardband.

In some implementations, the first uplink channel belongs to N repeated transmissions, and N is an integer greater than or equal to 2, for example, N=4. The method provided by the embodiment 200 may further include at least one of the following 1) to 3):

1) The first transmission resource is not considered as an effective transmission resource, and the transmission resource of the first uplink channel is continuously determined until N transmission resources are determined. The difference between this example and the following 2) is that in this example, it is determined that the transmission resource unnecessarily completes N-time transmissions, and transmission may not be performed due to other factors.

2) The transmission resource of the first uplink channel is continuously determined, and N repeated transmissions of the first uplink channel are completed. The difference between this example and the above 1) is that in this example, it is determined that the transmission resource completes N-time transmissions.

3) In a case that N available transmission resources do not appear or N repeated transmissions are not completed within a preset duration after the first transmission of the first uplink channel, skip performing the remaining transmission of the first uplink channel. The remaining transmission may be a transmission that is not completed within a preset duration. For example, N=4, in a case that three available transmission resources appear or three repeated transmissions are completed within the preset duration, the last transmission is not performed.

Example 2

As mentioned in the embodiment 200, according to the frequency domain resource type information on the time unit of the uplink transmission, the terminal determines the frequency domain resource for transmitting the first uplink channel, which includes at least one of the following 1) and 2):

1) The terminal determines at least one available subband according to the frequency domain resource type information of the uplink transmission; and a subband for transmitting the first uplink channel is determined according to the at least one available subband. The available subband may be an uplink subband.

In this example, in a case that the number of the at least one available subband is 1, this available subband is directly used as the subband for transmitting the first uplink channel; and In a case that the number of the at least one available subband is greater than 1, the terminal may select the subband for transmitting the first uplink channel, for example, may select the subband with the lowest frequency domain position as the subband for transmitting the first uplink channel.

2) The terminal determines the type (such as uplink and downlink) of each subband of a subband combination according to the frequency domain resource type information on the time unit of the uplink transmission, and determines the frequency domain resource for transmitting the first uplink channel according to the type of each subband of the subband combination, where the frequency domain resource of at least one subband type combination of the subband combination is configured by a network side device.

For the subband combination in this example, as shown in the subbands in the third time unit to the seventh time unit in FIG. 4, the subband combination in the five time units includes four subbands.

In some implementations, the determining a subband for transmitting the first uplink channel according to the at least one available subband mentioned in the above 1) includes at least one of the following: the subband for transmitting the first uplink channel is determined according to an index value of the at least one available subband; and the subband for transmitting the first uplink channel is determined according to a frequency domain position of the at least one available subband.

In some implementations, the subband for transmitting the first uplink channel has a lowest or highest index value in the at least one available subband; and/or the subband for transmitting the first uplink channel has a lowest or highest frequency in the at least one available subband.

Example 3

As mentioned in the embodiment 200, according to the frequency domain resource type information on the time unit of the uplink transmission, the terminal determines the frequency domain resource for transmitting the first uplink channel, which includes at least one of the following 1) and 2):

1) an available Frequency Domain Resource Assignment (FDRA) configuration is selected according to the frequency domain resource type information on the time unit of the uplink transmission; and the frequency domain resource for transmitting the first uplink channel is determined according to the available FDRA configuration, where the first uplink channel includes a PUSCH.

In some implementations, the available FDRA configuration has a lowest or highest index value in a plurality of FDRA configurations, where a network side device is the terminal configuration or indicates the plurality of FDRA configurations.

2) An available PUCCH resource is selected according to the frequency domain resource type information on the time unit of the uplink transmission, where the first uplink channel includes a PUCCH.

In some implementations, the available PUCCH resource has a lowest or highest index value in a plurality of PUCCH resources, where a network side device is the terminal configuration or indicates the plurality of PUCCH resources.

Example 4

As mentioned in the embodiment 200, according to the frequency domain resource type information on the time unit of the uplink transmission, the terminal determines the frequency domain resource for transmitting the first uplink channel, which includes: the frequency domain resource for transmitting the first uplink channel is determined according to the frequency domain resource type information on the time unit of the uplink transmission and an indication of an FDRA domain.

In some implementations, the size (the number of bits) of the FDRA domain in DCI is determined according to the available frequency domain resource. The available frequency domain resource includes at least one of the following 1) and 2): 1) an available subband on a scheduled PUSCH transmission time resource. For example, the size of the FDRA domain is determined by the available subband on the scheduled PUSCH transmission time resource (in some implementations, the transmission occasion of the first transmission). 2) A collection or intersection of available frequency domain resources on at least one time unit. For example, a collection or intersection of available frequency domain resources on at least one time unit is determined according to the subband/guardband resource indicated by the network side device.

Example 5

The first uplink channel belongs to a frequency-hopping transmission. As mentioned in the embodiment 200, according to the frequency domain resource type information on the time unit of the uplink transmission, the terminal determines the frequency domain resource for transmitting the first uplink channel, which includes at least one of the following 1) and 2):

1) the terminal determines the type of each subband of a subband combination according to the frequency domain resource type information on the time unit of the uplink transmission, and determines the frequency domain resource for transmitting the first uplink channel according to the type of each subband of the subband combination, where the frequency domain resource of the frequency-hopping transmission of the combination of at least one subband type of the subband combination is configured by a network side device.

For example, the network side device configures different first hop resources and second hop resources for different subband combinations, and the terminal performs frequency-hopping transmission on the corresponding 1st hop and 2nd hop according to the subband combination corresponding to the current time unit.

2) The terminal determines the available frequency domain resource according to the frequency domain resource type information on the time unit of the uplink transmission, and determines the frequency domain resource for transmitting the first uplink channel according to the available frequency domain resource. In this example, the terminal performs frequency-hopping transmission based on the available frequency domain resource.

Example 6

The first uplink channel belongs to a frequency-hopping transmission. The method provided by the embodiment 200 further includes: according to the frequency domain resource type information on the time unit of the uplink transmission, the frequency-hopping transmission is not performed in a case of determining that a transmission resource with one transmission occasion is an unavailable resource. For example, transmission is performed through a non-frequency-hopping transmission manner.

The unavailable resource includes at least one of the following: a resource in a downlink subband, a resource in a flexible subband, and a resource in a guardband.

The transmission resource of the transmission occasion is determined by the terminal based on each transmission or repeated transmissions, or is determined based on a scheduled time domain resource.

In this example, one transmission/repeated transmissions for the frequency-hopping transmission includes/include at least one time unit, or the scheduled time domain resource includes at least one time unit, so that the terminal determines whether the frequency domain resource is available or not on the at least one time unit.

This example may further include the following steps: according to the frequency domain resource type information on the time unit of the uplink transmission, the terminal renumbers the available frequency domain resources to obtain renumbered available frequency domain resources. According to the frequency domain resource type information on the time unit of the uplink transmission, the terminal determines the frequency domain resource for transmitting the first uplink channel, which includes: the frequency domain resource for transmitting the first uplink channel is determined according to the renumbered available frequency domain resources.

To describe the transmission resource determining method provided by the embodiments of this application in detail, description is performed below with reference to the specific embodiments in FIG. 5 to FIG. 9.

In FIG. 5 to FIG. 9, the transverse direction is a time domain direction, and the longitudinal direction is a frequency domain direction. Squares filled with oblique lines represent uplink, and squares filled with small black dots represent downlink. A time domain length of each square may be one slot. In FIG. 5 to FIG. 9, it may be considered that there are two time units (that is, five squares form a time unit), or may be considered that each square represents a time unit. In FIG. 5 to FIG. 9, it may be considered that there are four subbands on a frequency domain, a guardband is between the subbands, and a dashed box in a longitudinal direction may be considered as the guardband.

Embodiment 1

This embodiment determines a subband for transmission, corresponding to that as mentioned in the embodiment 200, according to the frequency domain resource type information on the time unit of the uplink transmission, the terminal determines the frequency domain resource for transmitting the first uplink channel.

Figure 5:
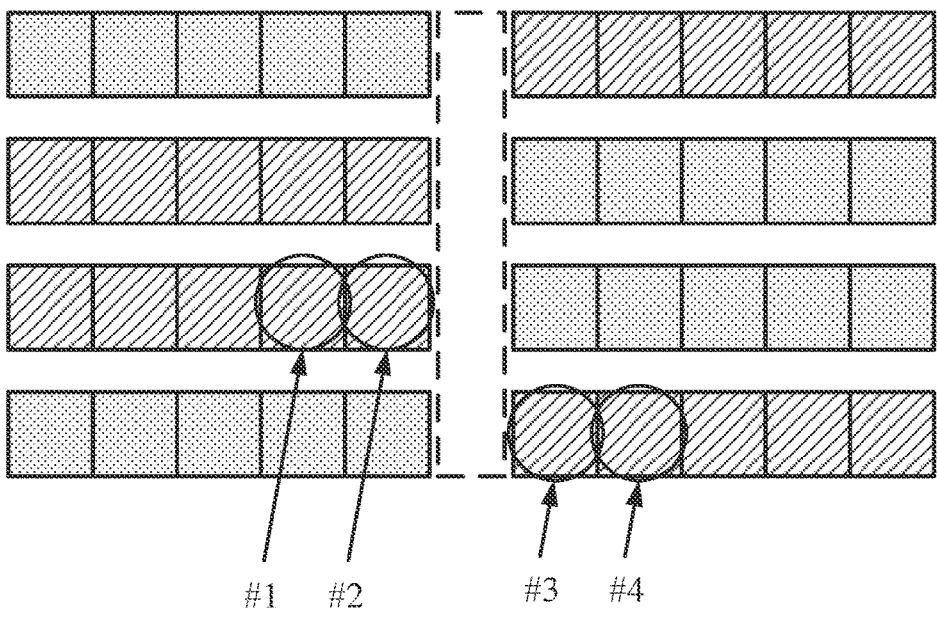
FIG. 5 is a schematic diagram of a transmission resource determining method according to an embodiment of this application.

As shown in FIG. 5, a network configures or indicates repeated transmissions of the first uplink channel on a plurality of time units (such as slot), the frequency domain transmission resource indicated by the network is on one of the subbands, and the transmission direction of the subband changes on the time unit of the subsequent transmission.

For example, in FIG. 5, the third repeated transmission cannot be performed on the previous subband, then at this time, the terminal selects a subband with a lowest index value and a subband with a lowest frequency for uplink transmission, and four transmissions are completed in FIG. 5.

Or in other examples, in a case that the subband of the uplink transmission is unavailable, the terminal does not perform this transmission, that is, the third and fourth repeated transmissions are not performed.

Another manner is that the terminal determines the transmission resource according to the configuration or indication of the network on the transmission resource.

Figure 6:
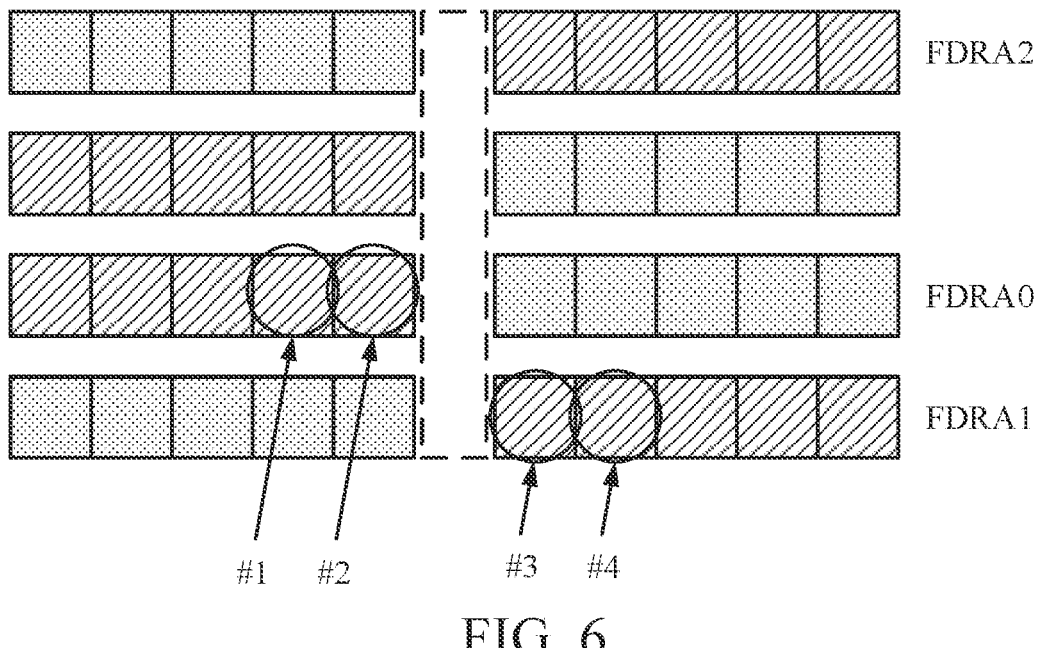
FIG. 6 is a schematic diagram of a transmission resource determining method according to an embodiment of this application.

For example, for a PUSCH, the network configures or indicates a plurality of FDRA, and the terminal selects the available FDRA configurations for a PUSCH transmission. In some implementations, the available FDRA configuration with the lowest index value is used. As shown in FIG. 6, the available FDRA configurations are an FDRA1 and an FDRA2, and the terminal selects the FDRA1 with the lowest index value for the PUSCH transmission.

Figure 7:
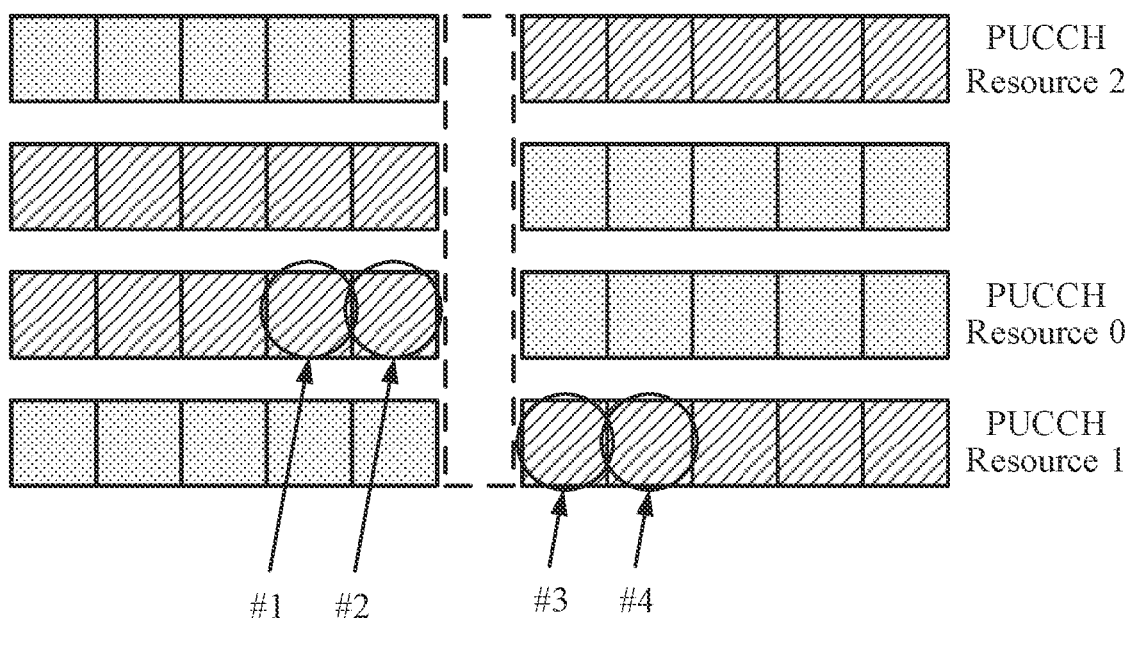
FIG. 7 is a schematic diagram of a transmission resource determining method according to an embodiment of this application.

For a PUCCH, the network configures or indicates a plurality of PUCCH resources, and the terminal selects the available PUCCH resource for transmission. In some implementations, the PUCCH resource with the lowest index value is used. As shown in FIG. 7, the available PUCCH resources are a PUCCH resource 1 and a PUCCH resource 2, and the terminal selects the PUCCH1 with the lowest index value for a PUCCH transmission.

Another manner is that the terminal does not change the frequency domain resource for transmission. In a case that the frequency domain resource is unavailable, an available slot is continuously determined on the same frequency domain resource until N transmission resources are determined, or N transmissions are completed.

Figure 8:
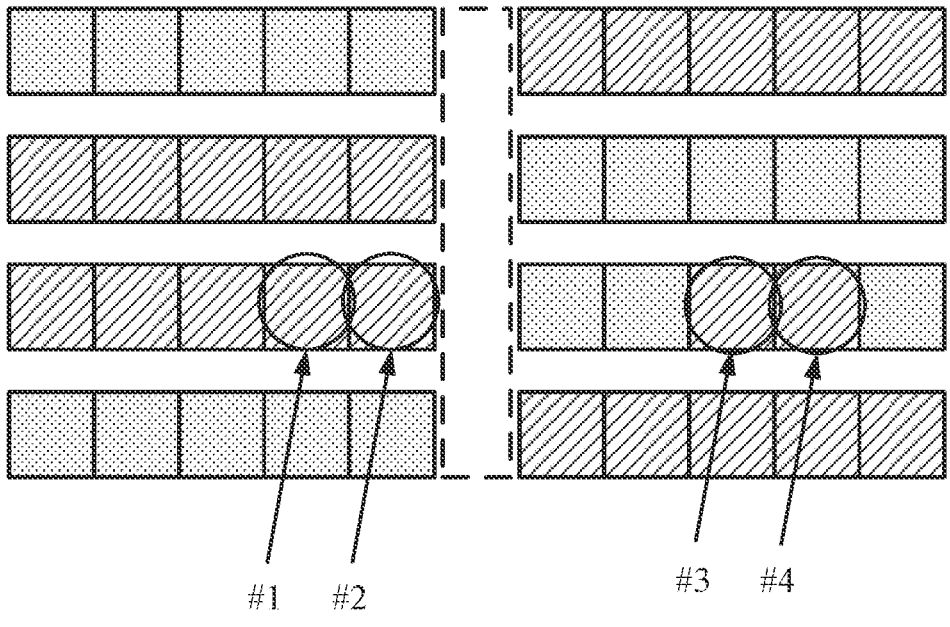
FIG. 8 is a schematic diagram of a transmission resource determining method according to an embodiment of this application.

Or the terminal determines the frequency domain resource for transmission according to a transmission delay, for example, within T time (corresponding to a preset duration in the above embodiments) after the start time, N repeated transmissions may be completed, or N transmission resources are determined, then the terminal uses the frequency domain resource determining method shown in FIG. 8, that is, at the frequency domain position until N transmission resources are determined. Or within T time after the start time, N repeated transmissions cannot be completed, or N transmission resources are not determined, the terminal uses the above methods of this embodiment to determine the frequency domain resource.

Embodiment 2

This embodiment determines a frequency-hopping manner.

In this embodiment, in a case that the network configures or instructs the terminal to perform frequency-hopping transmission, and the available uplink transmission resources on different time units change, the terminal is required to determine the transmission method in this case.

Figure 9:
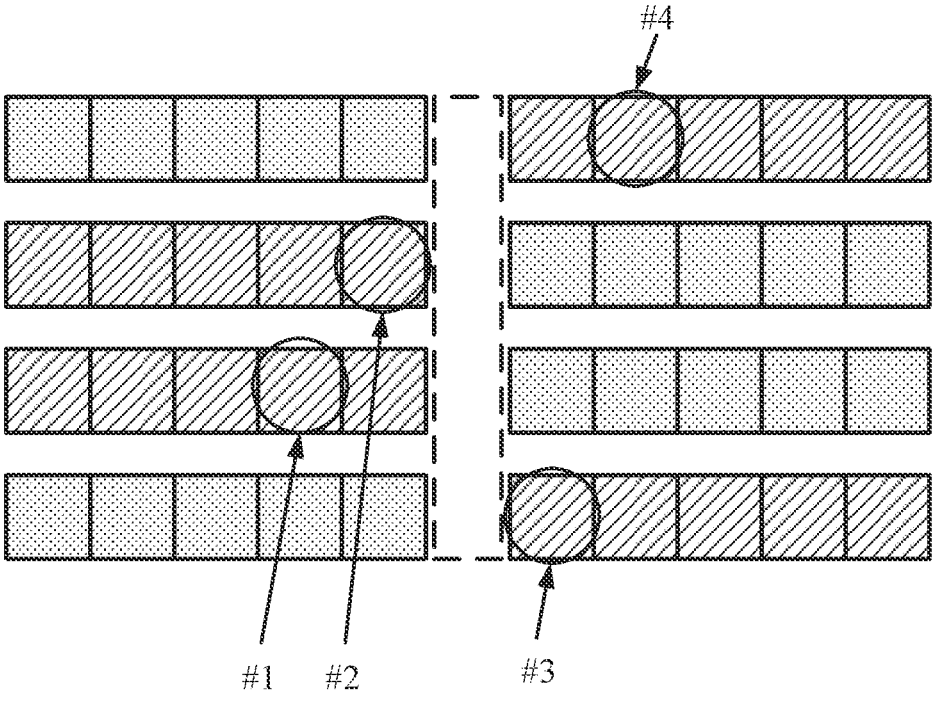
FIG. 9 is a schematic diagram of a transmission resource determining method according to an embodiment of this application.

A method respectively configures a first hop and a 2nd hop for different subband combinations (subband combination), and the terminal determines the transmission resource according to the current subband combination for transmission. For example, the start RB idx of the 1st hop and the 2nd hop of the network configuration [DL UL UL DL] is M and N; and the start RB idx of the 1st hop and the 2nd hop of the configuration [UL DL DL UL] is P and Q. The terminal determines the resource for the frequency-hopping transmission according to the current subband combination, specifically as shown in FIG. 9.

The second manner is that frequency-hopping transmission is not performed in a case that the frequency-hopping resource is determined to be unavailable. For example, transmission is performed by using the same frequency, or transmission is performed in the manner of Embodiment 1.

Another manner is that the network determines the resource for the frequency-hopping transmission based on the available subband. For example, the frequency domain transmission resource for transmission at the second time is determined based on the available subband idx of the first time of the frequency-hopping transmission and the RB idx in the subband. For example, the available transmission resources at the first time are subband #2, RB_X} and {subband #3, RB_Y}, and Subband #2/3 is the first and second available subbands of the first time, then the terminal performs the frequency-hopping transmission on the first and second available subbands, that is, {subband #1, RB_X} and {subband #4, RB_Y}, of the second time.

Embodiment 3

This embodiment performs RB renumbering based on available resources.

In this embodiment, the terminal performs renumbering based on the RB index in the current available subband (such as uplink), and the transmission frequency domain resource of the PUSCH is determined based on the renumbered available RB index.

For example, the available RB index determined according to the available subband at the first time is {RB_idx1, RB_idx2, . . . RB_idxN}={RB_idx_a1, RB_idx_a2, . . . RB_idx_aN}, where the part before the equal sign is the index after the numbering, and the subsequent ones are similar.

The available RB index value determined according to the available subband at the second time is {RB_idx1, RB_idx2, . . . RB_idxN}={RB_idx_b1, RB_idx_b2, . . . RB_idx_bN}. The terminal determines an RB set of the PUSCH according to the reordered RB index values idx1, . . . , and idxN.

Embodiment 4

This embodiment determines the size of the FDRA domain based on the available frequency domain resource.

In this embodiment, the terminal determines the size of bits number of the FDRA according to the RB of the available frequency domain resource, where the available frequency domain resource may the available subband at the time of the scheduled first PUSCH transmission, or the size of the FDRA is determined according to an intersection or union of the available resources determined on a plurality of time units. That is, the size of the FDRA domain in DCI is not determined based on the size of BWP, but is determined according to the size of the available RB number.

That is, in the formula $$\left\lceil \log_2 \left( \frac{N_{RB}^{available}(N_{RB}^{available}+1)}{2} \right) \right\rceil,$$

$$N_{RB}^{available}$$

is the size of the available RB number. This embodiment does not determine the number of bits of the FDRA of the DCI based on the size of the BWP.

The methods in Embodiment 3 and Embodiment 4 are also applicable to frequency domain resource assignment of a downlink PDSCH transmission.

The transmission resource determining method according to the embodiment of this application is described above in detail with reference to FIG. 2. The transmission resource determining method according to another embodiment of this application is described in detail below with reference to FIG. 10. It is to be understood that the interaction between the network side device and the terminal described from the network side device is the same as the description of the terminal side of the method shown in FIG. 2, and the related description is appropriately omitted to avoid repetition.

FIG. 10 a schematic diagram of an implementation flow of a transmission resource determining method according to an embodiment of this application, which can be applied to a network side device. As shown in FIG. 10, the method 1000 includes the following steps:

S1002: according to frequency domain resource type information on a time unit of an uplink transmission, a network side device determines at least one of the following: whether to transmit a first uplink channel; and a frequency domain resource for transmitting the first uplink channel.

In the embodiments of this application, the network side device may determine whether to transmit the first uplink channel and/or determine the frequency domain resource for transmitting the first uplink channel according to the frequency domain resource type information on the time unit of the uplink transmission, thereby solving the problem that the communication efficiency is affected because the network side device cannot transmit the uplink channel, and improving the communication efficiency.

In some implementations, as an embodiment, the frequency domain resource type information includes direction information of frequency domain resource transmission, and the direction information of frequency domain resource transmission includes at least one of the following: downlink, uplink, flexible and a guardband.

In some implementations, as an embodiment, according to the frequency domain resource type information on the time unit of the uplink transmission the network side device determines whether to transmit the first uplink channel, which includes: according to the frequency domain resource type information on the time unit of the uplink transmission, the network side device does not perform the first uplink channel on the first transmission resource in a case of determining that a first transmission resource of the uplink transmission overlaps with an unavailable resource.

In some implementations, as an embodiment, the first uplink channel belongs to N repeated transmissions, and N is an integer greater than or equal to 2; and the method further includes at least one of the following: the first transmission resource is not considered as an effective transmission resource, and the transmission resource of the first uplink channel is continuously determined until determining N transmission resources; the transmission resource of the first uplink channel is continuously determined and N repeated transmissions of the first uplink channel are completed; and in a case that N available transmission resources do not appear or N repeated transmissions are not completed within a preset duration after the first transmission of the first uplink channel, skip performing the remaining transmission of the first uplink channel.

In some implementations, as an embodiment, according to the frequency domain resource type information on the time unit of the uplink transmission, the network side device determines the frequency domain resource for transmitting the first uplink channel, which includes at least one of the following: the network side device determines at least one available subband according to the frequency domain resource type information of the uplink transmission; a subband for transmitting the first uplink channel is determined according to the at least one available subband; and the network side device determines the type of each subband of a subband combination according to the frequency domain resource type information on the time unit of the uplink transmission, and determines the frequency domain resource for transmitting the first uplink channel according to the type of each subband of the subband combination.

In some implementations, as an embodiment, according to the frequency domain resource type information on the time unit of the uplink transmission, the network side device determines the frequency domain resource for transmitting the first uplink channel, which includes at least one of the following: an available FDRA configuration is selected according to the frequency domain resource type information on the time unit of the uplink transmission; the frequency domain resource for transmitting the first uplink channel is determined according to the available FDRA configuration, where the first uplink channel includes a PUSCH; and an available PUCCH resource is selected according to the frequency domain resource type information on the time unit of the uplink transmission, where the first uplink channel includes a PUCCH.

In some implementations, as an embodiment, according to the frequency domain resource type information on the time unit of the uplink transmission, the network side device determines the frequency domain resource for transmitting the first uplink channel, which includes: the frequency domain resource for transmitting the first uplink channel is determined according to the frequency domain resource type information on the time unit of the uplink transmission and an indication of an FDRA domain.

In some implementations, as an embodiment, the first uplink channel belongs to a frequency-hopping transmission; and according to the frequency domain resource type information on the time unit of the uplink transmission, the network side device determines the frequency domain resource for transmitting the first uplink channel, which includes at least one of the following: the network side device determines the type of each subband of a subband combination according to the frequency domain resource type information on the time unit of the uplink transmission, and determines the frequency domain resource for transmitting the first uplink channel according to the type of each subband of the subband combination; and the network side device determines the available frequency domain resource according to the frequency domain resource type information on the time unit of the uplink transmission, and determines the frequency domain resource for transmitting the first uplink channel according to the available frequency domain resource.

In some implementations, as an embodiment, the first uplink channel belongs to a frequency-hopping transmission, and the method further includes: according to the frequency domain resource type information on the time unit of the uplink transmission, the frequency-hopping transmission is not performed in a case of determining that a transmission resource with one transmission occasion is an unavailable resource.

In some implementations, as an embodiment, the method further includes: according to the frequency domain resource type information on the time unit of the uplink transmission, the network side device renumbers the available frequency domain resources to obtain renumbered available frequency domain resources, where according to the frequency domain resource type information on the time unit of the uplink transmission, the network side device determines the frequency domain resource for transmitting the first uplink channel, which includes: the frequency domain resource for transmitting the first uplink channel is determined according to the renumbered available frequency domain resources.

The transmission resource determining method provided by the embodiments of this application may be performed by a transmission resource determining apparatus, or a control module for performing the transmission resource determining method in the transmission resource determining apparatus. In the embodiments of this application, the transmission resource determining apparatus provided by the embodiments of this application is described by taking the case where the transmission determining apparatus performs the transmission resource determining method.

FIG. 11 is a schematic structural diagram of a transmission resource determining apparatus according to an embodiment of this application. The apparatus may correspond to a terminal in other embodiments. As shown in FIG. 11, the apparatus 1100 includes the following modules:

a determination module 1102, configured to: according to frequency domain resource type information on a time unit of an uplink transmission, determines at least one of the following: whether to transmit a first uplink channel, and a frequency domain resource for transmitting the first uplink channel.

In the embodiments of this application, the apparatus 1100 may determine whether to transmit the first uplink channel and/or determine the frequency domain resource for transmitting the first uplink channel according to the frequency domain resource type information on the time unit of the uplink transmission, thereby solving the problem that the communication efficiency is affected because the apparatus 1100 cannot transmit the uplink channel, and improving the communication efficiency.

In some implementations, as an embodiment, the frequency domain resource type information includes direction information of frequency domain resource transmission, and the direction information of frequency domain resource transmission includes at least one of the following: downlink, uplink, flexible and a guardband.

In some implementations, as an embodiment, the determination module 1102 is configured to: according to the frequency domain resource type information on the time unit of the uplink transmission, skip transmitting the first uplink channel on the first transmission resource in a case of determining that a first transmission resource of the uplink transmission overlaps with an unavailable resource.

In some implementations, as an embodiment, the first uplink channel belongs to N repeated transmissions, and N is an integer greater than or equal to 2; and the determination module 1102 is further configured to perform one of the following: skip considering the first transmission resource as an effective transmission resource, and continuously determine the transmission resource of the first uplink channel until determining N transmission resources; continuously determine the transmission resource of the first uplink channel and complete N repeated transmissions of the first uplink channel; and in a case that N available transmission resources does not appear or N repeated transmissions are not completed within a preset duration after the first transmission of the first uplink channel, skip performing the remaining transmission of the first uplink channel.

In some implementations, as an embodiment, the determination module 1102 is configured to perform at least one of the following: determine at least one available subband according to the frequency domain resource type information of the uplink transmission; determine a subband for transmitting the first uplink channel according to the at least one available subband; and determine the type of each subband of a subband combination according to the frequency domain resource type information on the time unit of the uplink transmission, and determine the frequency domain resource for transmitting the first uplink channel according to the type of each subband of the subband combination, where the frequency domain resource of at least one subband type combination of the subband combination is configured by a network side device.

In some implementations, as an embodiment, the determination module 1102 is configured to: determine the subband for transmitting the first uplink channel according to an index value of the at least one available subband; and the subband for transmitting the first uplink channel is determined according to a frequency domain position of the at least one available subband.

In some implementations, as an embodiment, the subband for transmitting the first uplink channel has a lowest or highest index value in the at least one available subband; and/or the subband for transmitting the first uplink channel has a lowest or highest frequency in the at least one available subband.

In some implementations, as an embodiment, the determination module 1102 is configured to perform at least one of the following: select an available FDRA configuration according to the frequency domain resource type information on the time unit of the uplink transmission; determine the frequency domain resource for transmitting the first uplink channel according to the available FDRA configuration, where the first uplink channel includes a PUSCH; and select an available PUCCH resource according to the frequency domain resource type information on the time unit of the uplink transmission, where the first uplink channel includes a PUCCH.

In some implementations, as an embodiment, the available FDRA configuration has a lowest or highest index value in a plurality of FDRA configurations, where a network side device is the terminal configuration or indicates the plurality of FDRA configurations; and/or the available PUCCH resource has a lowest or highest index value in a plurality of PUCCH resources, where a network side device is the terminal configuration or indicates the plurality of PUCCH resources.

In some implementations, as an embodiment, the determination module 1102 is configured to: determine the frequency domain resource for transmitting the first uplink channel according to the frequency domain resource type information on the time unit of the uplink transmission and an indication of an FDRA domain.

In some implementations, as an embodiment, the size of the FDRA domain is determined according to the available frequency domain resource, and the available frequency domain resource includes at least one of the following: an available subband on a scheduled PUSCH transmission time resource; and a collection or intersection of available frequency domain resources on at least one time unit.

In some implementations, as an embodiment, the first uplink channel belongs to a frequency-hopping transmission, and the determination module 1102 is configured to perform at least one of the following: determine the type of each subband of a subband combination according to the frequency domain resource type information on the time unit of the uplink transmission, and determine the frequency domain resource for transmitting the first uplink channel according to the type of each subband of the subband combination, where the frequency domain resource for the frequency-hopping transmission of the combination of at least one subband type of the subband combination is configured by a network side device; and determine the available frequency domain resource according to the frequency domain resource type information on the time unit of the uplink transmission, and determine the frequency domain resource for transmitting the first uplink channel according to the available frequency domain resource.

In some implementations, as an embodiment, the first uplink channel belongs to a frequency-hopping transmission, and the determination module 1102 is further configured to: according to the frequency domain resource type information on the time unit of the uplink transmission, skip performing the frequency-hopping transmission in a case of determining that a transmission resource with one transmission occasion is an unavailable resource.

In some implementations, as an embodiment, the transmission resource of the transmission occasion is determined by the apparatus based on each transmission or repeated transmissions, or is determined based on a scheduled time domain resource.

In some implementations, as an embodiment, the determination module 1102 is further configured to: according to the frequency domain resource type information on the time unit of the uplink transmission, renumber the available frequency domain resources to obtain renumbered available frequency domain resources. The frequency domain resource for transmitting the first uplink channel is determined according to the frequency domain resource type information on the time unit of the uplink transmission, which includes: the frequency domain resource for transmitting the first uplink channel is determined according to the renumbered available frequency domain resources.

In some implementations, as an embodiment, the unavailable resource includes at least one of the following: a resource in a downlink subband, a resource in a flexible subband, and a resource in a guardband.

In some implementations, as an embodiment, the time unit includes at least one of the following: a symbol, a slot, a subslot and a subframe.

The apparatus 1100 provided by the embodiments of this application may be referenced to the flow in the method 200 of the corresponding embodiments of this application; furthermore, each unit/module in the apparatus 1100 and the foregoing other operations and/or functions are respectively used to implement the corresponding flows of the method 200, and the same or equivalent technical effect can be achieved. For brevity, details are not described herein again.

The transmission resource determining apparatus in the embodiments of this application may be an apparatus, and an apparatus or electronic device with an operating system, or may be a component, an integrated circuit or a chip in a terminal. The apparatus or electronic device may be a mobile terminal or may be a non-mobile terminal. Exemplarily, the mobile terminal may include but not limited to the types of the terminal 11 listed above, and the non-mobile terminal may be a server, a Network Attached Storage (NAS), a personal computer, a television, a teller machine or a self-service machine, which will not be specifically limited in the embodiments of this application. The operating system may be an Android operating system, may be an iOS operating system, or may be another possible operating system, and is not specifically limited in the embodiments of this application.

The transmission resource determining apparatus provided by the embodiments of this application can implement various processes of the method embodiments in FIG. 2 to FIG. 10, and a same technical effect can be achieved. For brevity, details are not described herein again.

FIG. 12 is a schematic structural diagram of a transmission resource determining apparatus according to an embodiment of this application. The apparatus may correspond to a network side device in other embodiments. As shown in FIG. 12, the apparatus 1200 includes the following modules:

a determination module 1202, configured to: according to frequency domain resource type information on a time unit of an uplink transmission, determines at least one of the following: whether to transmit a first uplink channel; and a frequency domain resource for transmitting the first uplink channel.

In the embodiments of this application, the apparatus 1200 may determine whether to transmit the first uplink channel and/or determine the frequency domain resource for transmitting the first uplink channel according to the frequency domain resource type information on the time unit of the uplink transmission, thereby solving the problem that the communication efficiency is affected because the apparatus 1200 cannot transmit the uplink channel, and improving the communication efficiency.

In some implementations, as an embodiment, the frequency domain resource type information includes direction information of frequency domain resource transmission, and the direction information of frequency domain resource transmission includes at least one of the following: downlink, uplink, flexible and a guardband.

In some implementations, as an embodiment, the determination module 1202 is configured to: according to the frequency domain resource type information on the time unit of the uplink transmission, skip transmitting the first uplink channel on the first transmission resource in a case of determining that a first transmission resource of the uplink transmission overlaps with an unavailable resource.

In some implementations, as an embodiment, the first uplink channel belongs to N repeated transmissions, and N is an integer greater than or equal to 2; and the determination module 1202 is further configured to perform one of the following: skip considering the first transmission resource as an effective transmission resource, and continuously determine the transmission resource of the first uplink channel until determining N transmission resources; continuously determine the transmission resource of the first uplink channel and complete N repeated transmissions of the first uplink channel; and in a case that N available transmission resources does not appear or N repeated transmissions are not completed within a preset duration after the first transmission of the first uplink channel, skip performing the remaining transmission of the first uplink channel.

In some implementations, as an embodiment, the determination module 1202 is configured to perform at least one of the following: determine at least one available subband according to the frequency domain resource type information of the uplink transmission; determine a subband for transmitting the first uplink channel according to the at least one available subband; and determine the type of each subband of a subband combination according to the frequency domain resource type information on the time unit of the uplink transmission, and determine the frequency domain resource for transmitting the first uplink channel according to the type of each subband of the subband combination.

In some implementations, as an embodiment, the determination module 1202 is configured to perform at least one of the following: select an available FDRA configuration according to the frequency domain resource type information on the time unit of the uplink transmission; determine the frequency domain resource for transmitting the first uplink channel according to the available FDRA configuration, where the first uplink channel includes a PUSCH; and select an available PUCCH resource according to the frequency domain resource type information on the time unit of the uplink transmission, where the first uplink channel includes a PUCCH.

In some implementations, as an embodiment, the determination module 1202 is configured to: determine the frequency domain resource for transmitting the first uplink channel according to the frequency domain resource type information on the time unit of the uplink transmission and an indication of an FDRA domain.

In some implementations, as an embodiment, the first uplink channel belongs to a frequency-hopping transmission, and the determination module 1202 is configured to perform at least one of the following: determine the type of each subband of a subband combination according to the frequency domain resource type information on the time unit of the uplink transmission, and determine the frequency domain resource for transmitting the first uplink channel according to the type of each subband of the subband combination; determine the available frequency domain resource according to the frequency domain resource type information on the time unit of the uplink transmission, and determine the frequency domain resource for transmitting the first uplink channel according to the available frequency domain resource.

In some implementations, as an embodiment, the first uplink channel belongs to a frequency-hopping transmission, and the determination module 1202 is further configured to: according to the frequency domain resource type information on the time unit of the uplink transmission, skip performing the frequency-hopping transmission in a case of determining that a transmission resource with one transmission occasion is an unavailable resource.

In some implementations, as an embodiment, the determination module 1202 is further configured to: according to the frequency domain resource type information on the time unit of the uplink transmission, renumber the available frequency domain resources to obtain renumbered available frequency domain resources. The frequency domain resource for transmitting the first uplink channel is determined according to the frequency domain resource type information on the time unit of the uplink transmission, which includes: the frequency domain resource for transmitting the first uplink channel is determined according to the renumbered available frequency domain resources.

The apparatus 1200 provided by the embodiments of this application may be referenced to the flow in the method 1000 of the corresponding embodiments of this application; furthermore, each unit/module in the apparatus 1200 and the foregoing other operations and/or functions are respectively used to implement the corresponding flows of the method 1000, and the same or equivalent technical effect can be achieved. For brevity, details are not described herein again.

In some implementations, as shown in FIG. 13, the embodiments of this application further provide a communication device 1300, including a processor 1301, a memory 1302, and a computer program or instruction stored in the memory 1302 and runnable on the processor 1301. For example, in a case that the communication device 1300 is a terminal, the program instruction, when being executed by the processor 1301, implements various processes of the above transmission resource determining method embodiments, and a same technical effect can be achieved. In a case that the communication device 1300 is a network side device, the program or instruction, when being executed by the processor 1301, implements various processes of the above transmission resource determining method embodiments, and a same technical effect can be achieved. For brevity, details are not described herein again.

Figure 14:
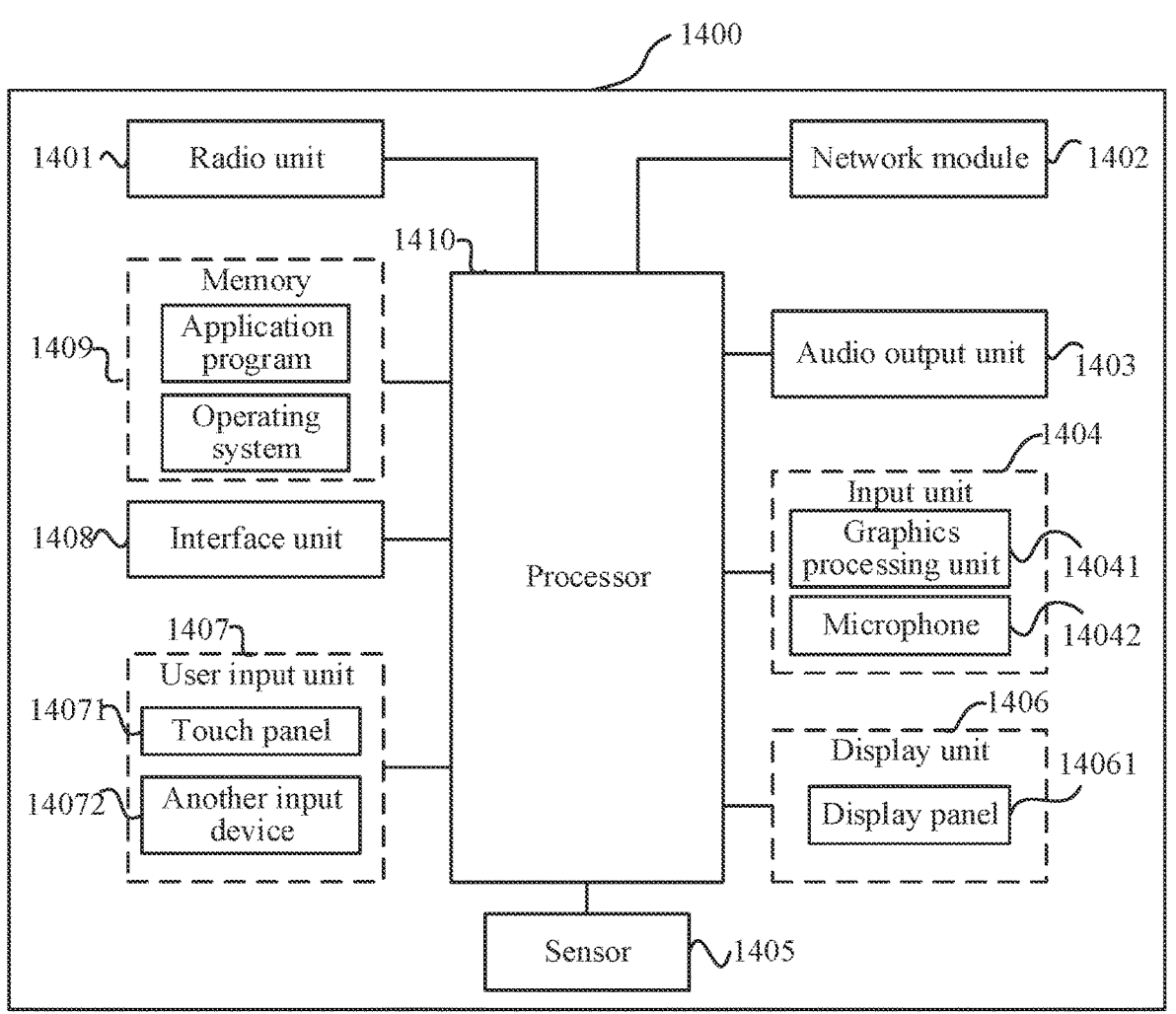
FIG. 14 is a block diagram of a terminal according to an embodiment of this application.

The embodiments of this application provide a terminal, including a processor and a communication interface. The processor is configured to: according to frequency domain resource type information on a time unit of an uplink transmission, determine at least one of the following: whether to transmit a first uplink channel; and a frequency domain resource for transmitting the first uplink channel. The terminal embodiment corresponds to the above terminal side method embodiment. Each implementation process and implementation of the above method embodiment may be suitable for the terminal embodiment, and a same technical effect can be achieved. Specifically, FIG. 14 is a schematic diagram of a hardware structure of a terminal according to the embodiments of this application.

The terminal 1400 includes but is not limited to: at least some components of a radio frequency unit 1401, a network module 1402, an audio output unit 1403, an input unit 1404, a sensor 1405, a display unit 1406, a user input unit 1407, an interface unit 1408, a memory 1409, a processor 1410.

Those skilled in the art may understand that the terminal 1400 may further include a power supply (such as a battery) for supplying power to the components. The power supply may be logically connected to the processor 1410 by a power management system, thereby implementing functions such as charging, discharging, and power consumption management by using the power management system. The terminal structure shown in FIG. 14 does not constitute a limitation on the terminal, and the terminal may include more or fewer components than shown, or combine some components, or have different component arrangements, which are not described herein in detail.

It is to be understood that in the embodiments of this application, the input unit 1404 may include a Graphics Processing Unit (GPU) 14041 and a microphone 14042. The graphics processing unit 14041 performs processing on image data of a static picture or a video that is obtained by an image acquisition device (for example, a camera) in a video acquisition mode or an image acquisition mode. The display unit 1406 may include a display panel 14061. The display panel 14061 may be configured in the form of a liquid crystal display, an organic light-emitting diode, or the like. The user input unit 1407 includes a touch panel 14071 and another input device 14072. The touch panel 14071 is also referred to as a touch screen. The touch panel 14071 may include two parts: a touch detection apparatus and a touch controller. The another input device 14072 may include, but not limited to, a physical keyboard, a functional key (such as a volume control key or a switch key), a track ball, a mouse, and a joystick, which are not described herein in detail.

In the embodiments of this application, after the radio frequency unit 1401 receives downlink data from the network side device, the downlink data is sent to the processor 1410 for processing. In addition, uplink data is sent to the network side device. Generally, the radio frequency unit 1401 includes, but is not limited to, an antenna, at least one amplifier, a transceiver, a coupler, a low noise amplifier, a duplexer, and the like.

The memory 1409 may be configured to store a software program or instruction and various data. The memory 1409 may mainly include a program or instruction storage area and a data storage area. The program or instruction storage area may store an operating system, an application program instruction required by at least one function (for example, a sound playback function and an image display function), and the like. In addition, the memory 1409 may include a high speed random access memory and may further include a non-volatile memory. The non-volatile memory may be a Read-Only Memory (ROM), a Programmable ROM (PROM), an Erasable PROM (EPROM), an Electrically EPROM (EEPROM) or a flash memory, for example, at least one magnetic disk storage device, a flash memory or another volatile solid-state storage device.

The processor 1410 may include one or more processing units. In some implementations, the processor 1410 may integrate an application processor and a modem processor, where the application processor mainly processes an operating system, a user interface, an application program, and the like, and the modem processor mainly processes wireless communication, such as a baseband processor. It is to be understood that the modem processor may not be integrated into the processor 1410.

The processor 1410 may be configured to: according to frequency domain resource type information on a time unit of an uplink transmission, determine at least one of the following: whether to transmit a first uplink channel; and a frequency domain resource for transmitting the first uplink channel.

In the embodiments of this application, the terminal may determine whether to transmit the first uplink channel and/or determine the frequency domain resource for transmitting the first uplink channel according to the frequency domain resource type information on the time unit of the uplink transmission, thereby solving the problem that the communication efficiency is affected because the terminal cannot transmit the uplink channel, and improving the communication efficiency.

The terminal 1400 provided by the embodiments of this application may also implement various processes of the foregoing transmission resource determining method embodiments, and a same technical effects can be achieved. To avoid repetition, details are not be described herein again.

The embodiments of this application further provide a network side device, including a processor and a communication interface. The processor is configured to: according to frequency domain resource type information on a time unit of an uplink transmission, determine at least one of the following: whether to transmit a first uplink channel; and a frequency domain resource for transmitting the first uplink channel. The network side device embodiment corresponds to the above network side device side method embodiment. Each implementation process and implementation of the above method embodiment may be suitable for the network side device embodiment, and a same technical effect can be achieved.

Figure 15:
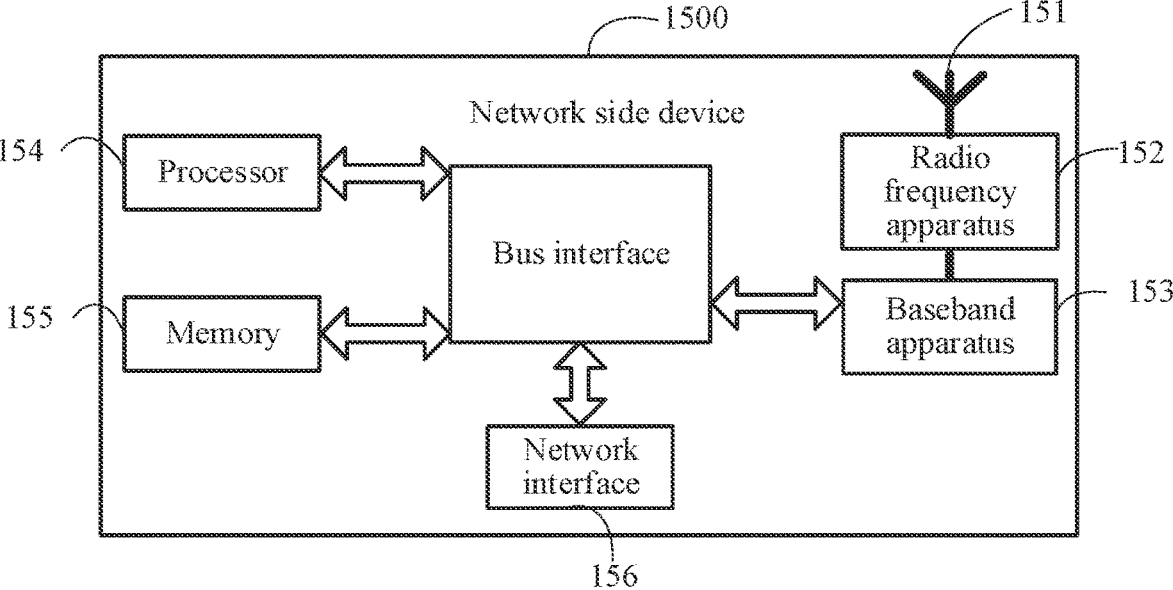
FIG. 15 is a block diagram of a network side device according to an embodiment of this application.

In some implementations, the embodiments of this application further provide a network device. As shown in FIG. 15, the network side device 1500 includes: an antenna 151, a radio frequency apparatus 152 and a baseband apparatus 153. The antenna 151 is connected to the radio frequency apparatus 152. In an uplink direction, the radio frequency apparatus 152 receives information through the antenna 151, and sends the received information to the baseband apparatus 153 for processing. In a downlink direction, the baseband apparatus 153 processes information to be sent and sends the information to the radio frequency apparatus 152, and the radio frequency apparatus 152 processes the received information and then sends the information through the antenna 151.

The foregoing band processing apparatus may be located in the baseband apparatus 153, and the method performed by the network side device in the foregoing embodiment may be implemented in the baseband apparatus 153. The baseband apparatus 153 includes a processor 154 and a memory 155.

The baseband apparatus 153 may include, for example, at least one baseband board, and a plurality of chips are arranged on the baseband board. As shown in FIG. 15, one of the chips is, for example, the processor 154, and is connected to the memory 155 to invoke a program in the memory 155, so as to perform the operations of the network side device shown in the foregoing method embodiment.

The baseband apparatus 153 may further include a network interface 156, configured to exchange information with the radio frequency apparatus 152. For example, the interface is a Common Public Radio Interface (CPRI).

In some implementations, the network side device provided by the embodiments of this application further includes: an instruction or program stored in the memory 155 and runnable on the processor 154. The processor 154 invokes the instruction or program in the memory 155 to perform the method performed by each module in FIG. 12, and a same technical effect can be achieved. To avoid repetition, details are not described herein again.

The embodiments of this application further provide a computer-readable storage medium. The computer-readable storage medium stores a program or instruction. The program or instruction, when being executed by a processor, implements the processes of the above transmission resource determining method embodiment, and a same technical effect can be achieved. To avoid repetition, details are not described herein again.

The processor may be a processor in the terminal in the foregoing embodiment. The readable storage medium includes a computer-readable storage medium, such as a computer Read-Only Memory (ROM), a Random Access Memory (RAM), a magnetic disk, or an optical disc.

The embodiments of this application further provide a chip. The hip includes a processor and a communication interface. The communication interface is coupled to the processor. The processor is configured to run a program or instruction to implement all processes of the above transmission resource determining method embodiment, and a same technical effects can be achieved. To avoid repetition, details are not described herein again.

It is to be understood that the chip provided by the embodiments of this application may further be referred to as a system-on-chip, a system chip, a chip system or an on-chip system chip.

The terms "include," "comprise," or any other variation thereof in this specification is intended to cover a non-exclusive inclusion, which specifies the presence of stated processes, methods, objects, or apparatuses, but do not include the presence or addition of one or more other processes, methods, objects, or apparatuses. Without more limitations, elements defined by the sentence "including one" does not exclude that there are still other same elements in the processes, methods, objects, or apparatuses. In addition, the scope of the method and apparatus in the embodiments of this application is not limited to performing the function according to the shown or discussed order, or according to the related function, the function may be performed basically at the same time or in an opposite order. For example, the described method may be performed in an order different to the described order, and various steps may be added, omitted or combined. In addition, features described with reference to some examples may be combined in other examples.

Based on the descriptions of the foregoing implementations, a person skilled in the art may clearly understand that the method in the foregoing embodiments may be implemented by software in addition to a necessary universal hardware platform or by hardware only. Based on such an understanding, the technical solutions of this application essentially, or the part contributing to the related art, may be presented in the form of a computer software product. The computer software product is stored in a storage medium (for example, a ROM/RAM, a magnetic disk, or an optical disc) including several instructions to enable a terminal device (which may be a mobile phone, a computer, a server, a network side device, or the like) to perform the methods described in the embodiments of this application.

The embodiments of this application are described above with reference to the accompanying drawings, but this application is not limited to the foregoing specific implementations. The foregoing specific implementations are merely schematic instead of restrictive. Under enlightenment of this application, a person of ordinary skill in the art may make many forms without departing from aims and the protection scope of claims of this application, all of which fall within the protection scope of this application.

What is claimed is:

1. A transmission resource determining method, comprising:

determining, by a terminal, according to frequency domain resource type information on a time unit of an uplink transmission, that a first transmission resource of the uplink transmission overlaps with an unavailable resource, the frequency domain resource type information comprising direction information of frequency domain resource transmission, and the direction information of frequency domain resource transmission comprising at least one of downlink or uplink;

skipping transmitting, by the terminal, a first uplink channel on the first transmission resource; and continuously determining a transmission resource of the first uplink channel and completing N repeated transmissions of the first uplink channel, the first uplink channel belonging to the N repeated transmissions, and N being an integer greater than or equal to 2.

2. The transmission resource determining method according to claim 1, further comprising at least one of the following:

skipping considering the first transmission resource as an effective transmission resource, and continuously determining the transmission resource of the first uplink channel until determining N transmission resources;

or when N available transmission resources do not appear or the N repeated transmissions are not completed within a preset duration after the first transmission of the first uplink channel, skipping performing the remaining transmission of the first uplink channel.

3. The transmission resource determining method according to claim 1, further comprising:

determining, by the terminal, according to the frequency domain resource type information on the time unit of the uplink transmission, a frequency domain resource for transmitting the first uplink channel, comprising at least one of the following:

determining, by the terminal, at least one available subband according to the frequency domain resource type information of the uplink transmission;

determining a subband for transmitting the first uplink channel according to the at least one available subband; or determining, by the terminal, the type of each subband of a subband combination according to the frequency domain resource type information on the time unit of the uplink transmission, and determining the frequency domain resource for transmitting the first uplink channel according to the type of each subband of the subband combination, wherein the frequency domain resource of at least one subband type combination of the subband combination being configured by a network side device.

4. The transmission resource determining method according to claim 3, wherein the determining a subband for transmitting the first uplink channel according to the at least one available subband comprises:

determining the subband for transmitting the first uplink channel according to an index value of the at least one available subband; and determine the subband for transmitting the first uplink channel according to a frequency domain position of the at least one available subband.

5. The transmission resource determining method according to claim 4, wherein:

the subband for transmitting the first uplink channel has a lowest or highest index value in the at least one available subband; or the subband for transmitting the first uplink channel has a lowest or highest frequency in the at least one available subband.

6. The transmission resource determining method according to claim 1, further comprising:

determining, by the terminal, according to the frequency domain resource type information on the time unit of the uplink transmission, a frequency domain resource for transmitting the first uplink channel, comprising at least one of the following:

selecting an available Frequency Domain Resource Assignment (FDRA) configuration according to the frequency domain resource type information on the time unit of the uplink transmission;

determining the frequency domain resource for transmitting the first uplink channel according to the available FDRA configuration, wherein the first uplink channel comprises a Physical Uplink Shared CHannel (PUSCH); or selecting an available Physical Uplink Control CHannel (PUCCH) resource according to the frequency domain resource type information on the time unit of the uplink transmission, wherein the first uplink channel comprises a PUCCH.

7. The transmission resource determining method according to claim 6, wherein:

the available FDRA configuration has a lowest or highest index value in a plurality of FDRA configurations, and a network side device is a terminal configuration or indicates the plurality of FDRA configurations; or the available PUCCH resource has a lowest or highest index value in a plurality of PUCCH resources, and the network side device is the terminal configuration or indicates the plurality of PUCCH resources.

8. The transmission resource determining method according to claim 1, further comprising:

determining, by the terminal, according to the frequency domain resource type information on the time unit of the uplink transmission, a frequency domain resource for transmitting the first uplink channel, comprising:

determining the frequency domain resource for transmitting the first uplink channel according to the frequency domain resource type information on the time unit of the uplink transmission and an indication of a Frequency Domain Resource Assignment (FDRA) domain.

9. The transmission resource determining method according to claim 8, wherein the size of the FDRA domain is determined according to the available frequency domain resource, and the available frequency domain resource comprises at least one of the following:

an available subband on a scheduled Physical Uplink Shared CHannel (PUSCH) transmission time resource; or a collection or intersection of available frequency domain resources on at least one time unit.

10. The transmission resource determining method according to claim 1, wherein the first uplink channel belongs to a frequency-hopping transmission; and the transmission resource determining method further comprises:

determining, by the terminal, according to the frequency domain resource type information on the time unit of the uplink transmission, a frequency domain resource for transmitting the first uplink channel, comprising at least one of the following:

determining, by the terminal, the type of each subband of a subband combination according to the frequency domain resource type information on the time unit of the uplink transmission, and determining the frequency domain resource for transmitting the first uplink channel according to the type of each subband of the subband combination, wherein the frequency domain resource of the frequency-hopping transmission of the combination of at least one subband type of the subband combination is configured by a network side device; or determining, by the terminal, the available frequency domain resource according to the frequency domain resource type information on the time unit of the uplink transmission, and determining the frequency domain resource for transmitting the first uplink channel according to the available frequency domain resource.

11. The transmission resource determining method according to claim 1, wherein the first uplink channel belongs to a frequency-hopping transmission, and the transmission resource determining method further comprises:

skipping performing the frequency-hopping transmission when determining that a transmission resource with one transmission occasion is an unavailable resource, according to the frequency domain resource type information on the time unit of the uplink transmission.

12. The transmission resource determining method according to claim 11, wherein the transmission resource of the transmission occasion is determined by the terminal based on each transmission or repeated transmissions, or is determined based on a scheduled time domain resource.

13. The transmission resource determining method according to claim 11, further comprising:

determining, by the terminal, according to the frequency domain resource type information on the time unit of the uplink transmission, a frequency domain resource for transmitting the first uplink channel; and renumbering, by the terminal, according to the frequency domain resource type information on the time unit of the uplink transmission, the available frequency domain resources to obtain renumbered available frequency domain resources, wherein the determining, by the terminal, according to frequency domain resource type information on the time unit of the uplink transmission, a frequency domain resource for transmitting the first uplink channel comprises:

determining the frequency domain resource for transmitting the first uplink channel according to the renumbered available frequency domain resources.

14. The transmission resource determining method according to claim 1, wherein the unavailable resource comprises at least one of the following:

a resource in a downlink subband, a resource in a flexible subband, or a resource in a guardband.

15. The transmission resource determining method according to claim 1, wherein the time unit comprises at least one of the following:

a symbol, a slot, a subslot, or a subframe.

16. A terminal, comprising:

a memory storing computer-readable instructions; and a processor coupled to the memory and configured to execute the computer-readable instructions, wherein the computer-readable instructions, when executed by the processor, cause the processor to perform operations comprising:

determining, according to frequency domain resource type information on a time unit of an uplink transmission, that a first transmission resource of the uplink transmission overlaps with an unavailable resource, the frequency domain resource type information comprising direction information of frequency domain resource transmission, and the direction information of frequency domain resource transmission comprising at least one of downlink or uplink;

skipping transmitting, by the terminal, a first uplink channel on the first transmission resource; and continuously determining a transmission resource of the first uplink channel and completing N repeated transmissions of the first uplink channel, the first uplink channel belonging to the N repeated transmissions, and N being an integer greater than or equal to 2.

17. A network side device, comprising:

a memory storing computer-readable instructions; and a processor coupled to the memory and configured to execute the computer-readable instructions, wherein the computer-readable instructions, when executed by the processor, cause the processor to perform operations comprising:

determining, according to frequency domain resource type information on a time unit of an uplink transmission, that a first transmission resource of the uplink transmission overlaps with an unavailable resource, the frequency domain resource type information comprising direction information of frequency domain resource transmission, and the direction information of frequency domain resource transmission comprising at least one of downlink or uplink;

skipping transmitting, by the terminal, a first uplink channel on the first transmission resource; and continuously determining a transmission resource of the first uplink channel and completing N repeated transmissions of the first uplink channel, the first uplink channel belonging to the N repeated transmissions, and N being an integer greater than or equal to 2.

* * * * *